US012485357B2

(12) United States Patent
Kulavik et al.

(10) Patent No.: US 12,485,357 B2
(45) **Date of Patent: *Dec. 2, 2025**

(54) MULTI-DEVICE AUDIO INTERFACE

(71) Applicant: Voyetra Turtle Beach, Inc., White Plains, NY (US)

(72) Inventors: Richard Kulavik, San Jose, CA (US); Shobha Devi Kuruba Buchannagari, San Jose, CA (US); Kevin Arthur Robertson, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 18/094,548

(22) Filed: Jan. 9, 2023

(65) Prior Publication Data

US 2023/0158413 A1 May 25, 2023

Related U.S. Application Data

(63) Continuation of application No. 17/341,647, filed on Jun. 8, 2021, now Pat. No. 11,707,688, which is a continuation of application No. 16/702,141, filed on Dec. 3, 2019, now Pat. No. 11,027,206, which is a continuation of application No. 15/794,942, filed on Oct. 26, 2017, now Pat. No. 10,493,366, which is a continuation of application No. 15/366,636, filed on Dec. 1, 2016, now Pat. No. 9,808,725, which is a (Continued)

(51) Int. Cl.

| | |
|---|---|
| *A63F 13/98* | (2014.01) |
| *A63F 13/215* | (2014.01) |
| *A63F 13/424* | (2014.01) |
| *A63F 13/77* | (2014.01) |
| *A63F 13/87* | (2014.01) |

(52) U.S. Cl.

CPC ............ *A63F 13/98* (2014.09); *A63F 13/215* (2014.09); *A63F 13/424* (2014.09); *A63F 13/77* (2014.09); *A63F 13/87* (2014.09)

(58) Field of Classification Search

CPC ...... A63F 13/98; A63F 13/215; A63F 13/424; A63F 13/77; A63F 13/87

See application file for complete search history.

(56) References Cited

U.S. PATENT DOCUMENTS

| | | | | |
|---|---|---|---|---|
| 6,071,194 | A | 6/2000 | Sanderson | |
| 6,304,865 | B1 * | 10/2001 | Christensen | G10L 15/16 704/E15.017 |

(Continued)

*Primary Examiner* — Carl V Larsen

(74) *Attorney, Agent, or Firm* — McAndrews, Held & Malloy, Ltd.

(57) ABSTRACT

An electronic device may be configured to present a user interface via which a user can select from a plurality of commands associated with a particular video game. In response to a selection of one of the plurality of commands, the electronic device may transmit the selected one of the plurality of commands to a user interface device. The selected command may cause said user interface device to transmit a corresponding one or more simulated user inputs to a game console. The selection of the command may occur automatically in response to detection, by audio processing circuitry, of an occurrence of the particular audio clip in an audio signal output by the game console.

18 Claims, 10 Drawing Sheets

Related U.S. Application Data continuation of application No. 14/465,452, filed on Aug. 21, 2014, now Pat. No. 9,511,294.

(60) Provisional application No. 61/878,728, filed on Sep. 17, 2013.

(56) References Cited

U.S. PATENT DOCUMENTS

| | | | | |
|---|---|---|---|---|
| 8,560,331 | B1 * | 10/2013 | Pereira | H04N 21/439 704/503 |
| 9,511,294 | B2 | 12/2016 | Kulavik et al. | |
| 9,808,725 | B2 | 11/2017 | Kulavik et al. | |
| 10,493,366 | B2 | 12/2019 | Kulavik et al. | |
| 11,027,206 | B2 | 6/2021 | Kulavik et al. | |
| 11,565,188 | B2 * | 1/2023 | Kulavik | A63F 13/424 |
| 12,100,213 | B2 * | 9/2024 | Edpalm | G06V 20/52 |
| 2001/0026264 | A1 * | 10/2001 | Rosenberg | G06F 3/0354 345/156 |
| 2002/0106089 | A1 * | 8/2002 | Zheng | H03G 1/02 381/58 |
| 2002/0110246 | A1 * | 8/2002 | Gosior | A63F 13/12 381/2 |
| 2002/0163797 | A1 * | 11/2002 | Naghi | G06F 1/1632 362/85 |
| 2006/0084504 | A1 * | 4/2006 | Chan | A63F 13/235 463/39 |
| 2007/0004473 | A1 * | 1/2007 | Clark | H04M 1/2535 455/575.2 |
| 2007/0111796 | A1 * | 5/2007 | C. Giaimo, III | A63F 13/23 463/42 |
| 2007/0223668 | A1 | 9/2007 | Blumenfeld | |
| 2007/0279247 | A1 * | 12/2007 | Rye | G08C 17/02 398/115 |
| 2009/0144621 | A1 | 6/2009 | Sangster | |
| 2012/0071238 | A1 | 3/2012 | Bala | |
| 2012/0122577 | A1 | 5/2012 | Aronzon | |
| 2013/0198786 | A1 | 8/2013 | Cook | |
| 2014/0022087 | A1 * | 1/2014 | Lin | G08B 5/00 340/691.5 |
| 2014/0038721 | A1 * | 2/2014 | Archer | A63F 13/795 463/42 |
| 2014/0064390 | A1 * | 3/2014 | Uln | H04B 7/0408 375/267 |
| 2014/0073433 | A1 * | 3/2014 | Phang | A63F 13/327 463/40 |
| 2014/0298309 | A1 * | 10/2014 | Proschowsky | G06F 8/654 717/170 |
| 2015/0098575 | A1 | 4/2015 | Kulavik | |
| 2015/0104033 | A1 | 4/2015 | Kulavik | |
| 2015/0121230 | A1 | 4/2015 | Kulavik | |
| 2024/0251932 | A1 * | 8/2024 | Berry | A45F 4/02 |

* cited by examiner

MULTI-DEVICE AUDIO INTERFACE

CLAIM OF PRIORITY

This application is a continuation of application Ser. No. 17/341,647 filed on Jun. 8, 2021, which is a continuation of application Ser. No. 16/702,141 filed on Dec. 3, 2019, now U.S. Pat. No. 11,027,206, which is a continuation of application Ser. No. 15/794,942 filed on Oct. 26, 2017, now U.S. Pat. No. 10,493,366, which is a continuation of application Ser. No. 15/366,636 filed on Dec. 1, 2016, now U.S. Pat. No. 9,808,725, which is a continuation of application Ser. No. 14/465,452 filed on Aug. 21, 2014, now U.S. Pat. No. 9,511,294, which claims the benefit of priority to U.S. provisional patent application 61/878,728 filed on Sep. 17, 2013. The aforementioned documents are hereby incorporated herein by reference in their entirety.

INCORPORATION BY REFERENCE

U.S. patent application Ser. No. 13/040,144 titled "Gaming Headset with Programmable Audio" and published as US2012/0014553, is hereby incorporated herein by reference.

TECHNICAL FIELD

Aspects of the present application relate to electronic gaming. More specifically, to methods and systems for a multi-device gaming interface.

BACKGROUND

Limitations and disadvantages of conventional approaches to gaming interfaces will become apparent to one of skill in the art, through comparison of such approaches with some aspects of the present method and system set forth in the remainder of this disclosure with reference to the drawings.

BRIEF SUMMARY

Methods and systems are provided for a multi-device gaming interface, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
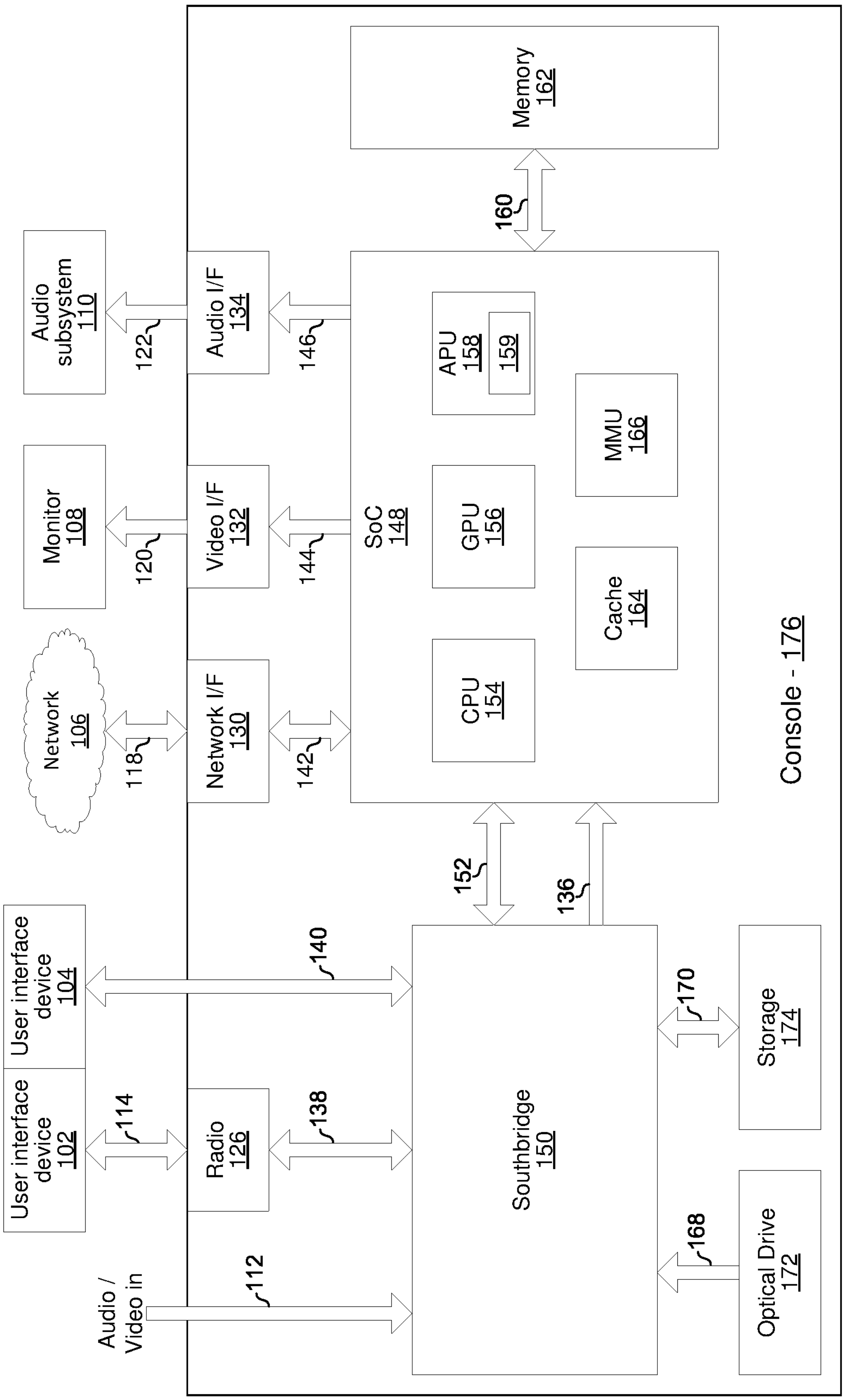
FIG. 1A depicts an example gaming console.

Referring to FIG. 1A, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 128, 142, 14, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 receives audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 comprises circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 comprises circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 comprises circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 comprises circuitry operable to execute instructions for controlling/coordinating the overall operation of the game console 176. Such instructions may be part of an operating system of the console and/or part of one or more software applications running on the console.

The graphics processing unit (GPU) 156 comprises circuitry operable to perform graphics processing functions such as compression, decompression, encoding, decoding, 3D rendering, and/or the like.

The audio processing unit (APU) 158 comprises circuitry operable to perform audio processing functions such as volume/gain control, compression, decompression, resampling, analog-to-digital conversion, digital-to-analog conversion, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 comprises additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may be, for example, a game controller (e.g., comprising one or more joysticks 107, directional pads 103, buttons 105 and/or the like), a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may comprise, for example, a headset, a combination of headset and audio basestation, or a set of speakers and accompanying audio processing circuitry. The game console 176 sends audio to the audio subsystem 110 via link(s) 122 (e.g., S/PDIF for digital audio or "line out" for analog audio). Additional details of an example audio subsystem 110 are described below.

Figure 1B:
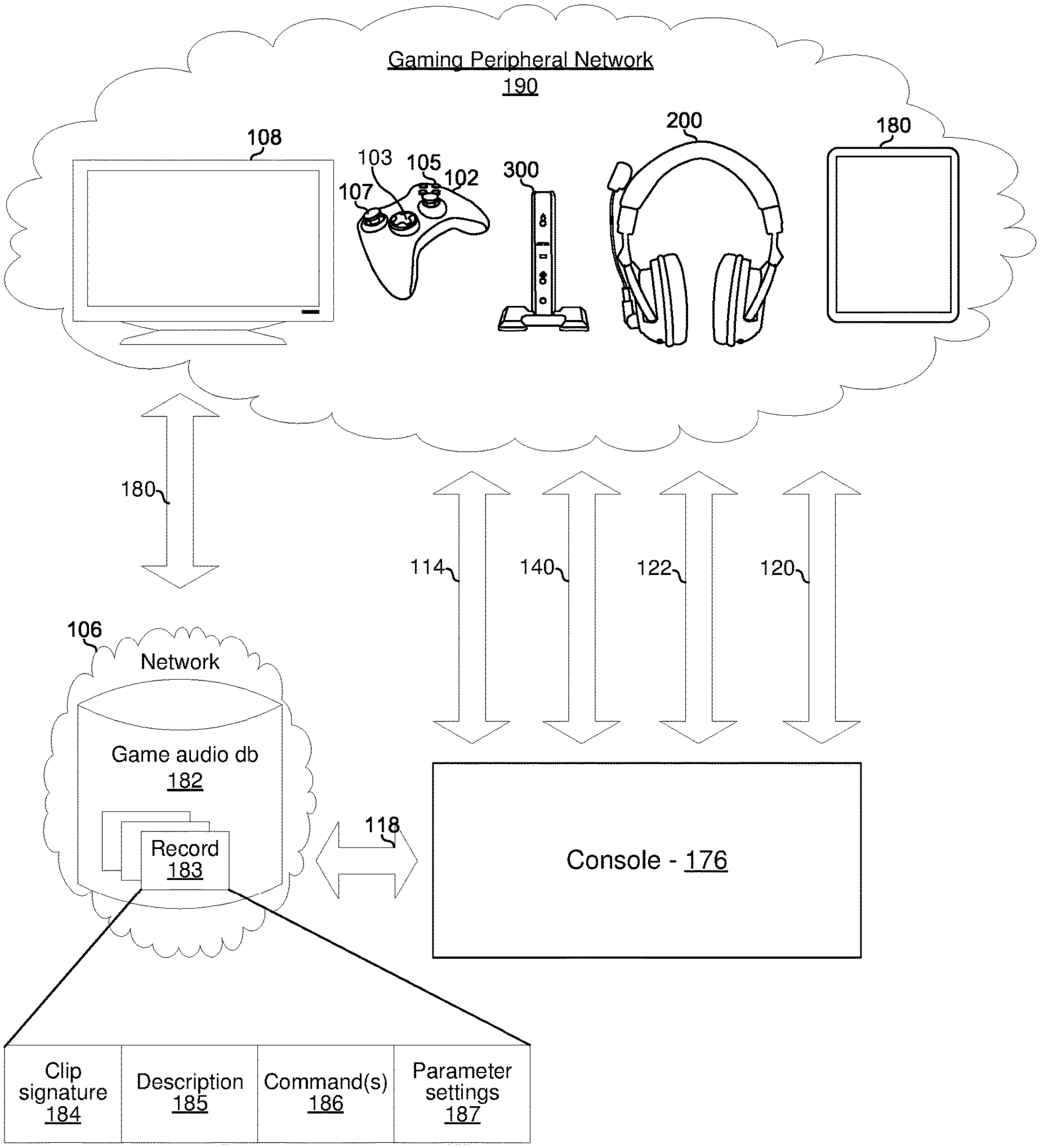
FIG. 1B depicts the example gaming console and an associated network of peripheral devices.

Referring to FIG. 1B, again shown is the console 176 connected to a plurality of peripheral devices and a network 106. The example peripheral devices shown include a monitor 108, an user interface device 102, a headset 200, an audio basestation 300, and a multi-purpose device 180.

The monitor 108 and user interface device 102 are as described above. An example implementation of the headset 200 is described below with reference to FIGS. 2A-2C. An example implementation of the audio basestation is as described below with reference to FIGS. 3A-3B.

The multi-purpose device 180 may be, for example, a tablet computer, a smartphone, a laptop computer, or the like, that runs an operating system such as Android, Linux, Windows, iOS, OSX, or the like. An example implementation of the multi-purpose device 180 is described below with reference to FIG. 4. Hardware (e.g., a network adaptor) and software (i.e., the operating system and one or more applications loaded onto the device 180) may configure the device 180 for operating as part of the GPN 190. For example, an application running on the device 180 may cause display of a graphical user interface via which a user can access gaming-related data, commands, functions, parameter settings, etc. and via which the user can interact with the console 176 and the other devices of the GPN 190 to enhance his/her gaming experience. Examples of such interactions between the device 180 and the other devices of the GPN 190 are described below with reference to FIGS. 5-9.

The peripheral devices 102, 108, 180, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 300 in a single hop (e.g., over a proprietary RF link) and with the tablet 180 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the tablet 180 in a single hop (e.g., over a Bluetooth or Wi-Fi direct link), while the tablet 180 may communicate with the headset 200 in two hops via the user interface device 102. These example interconnections among the peripheral devices of the GPN 190 are not exclusive, and any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 180 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190. Example use of data in the database 182 is described below with reference to FIG. 9.

Figure 2A:
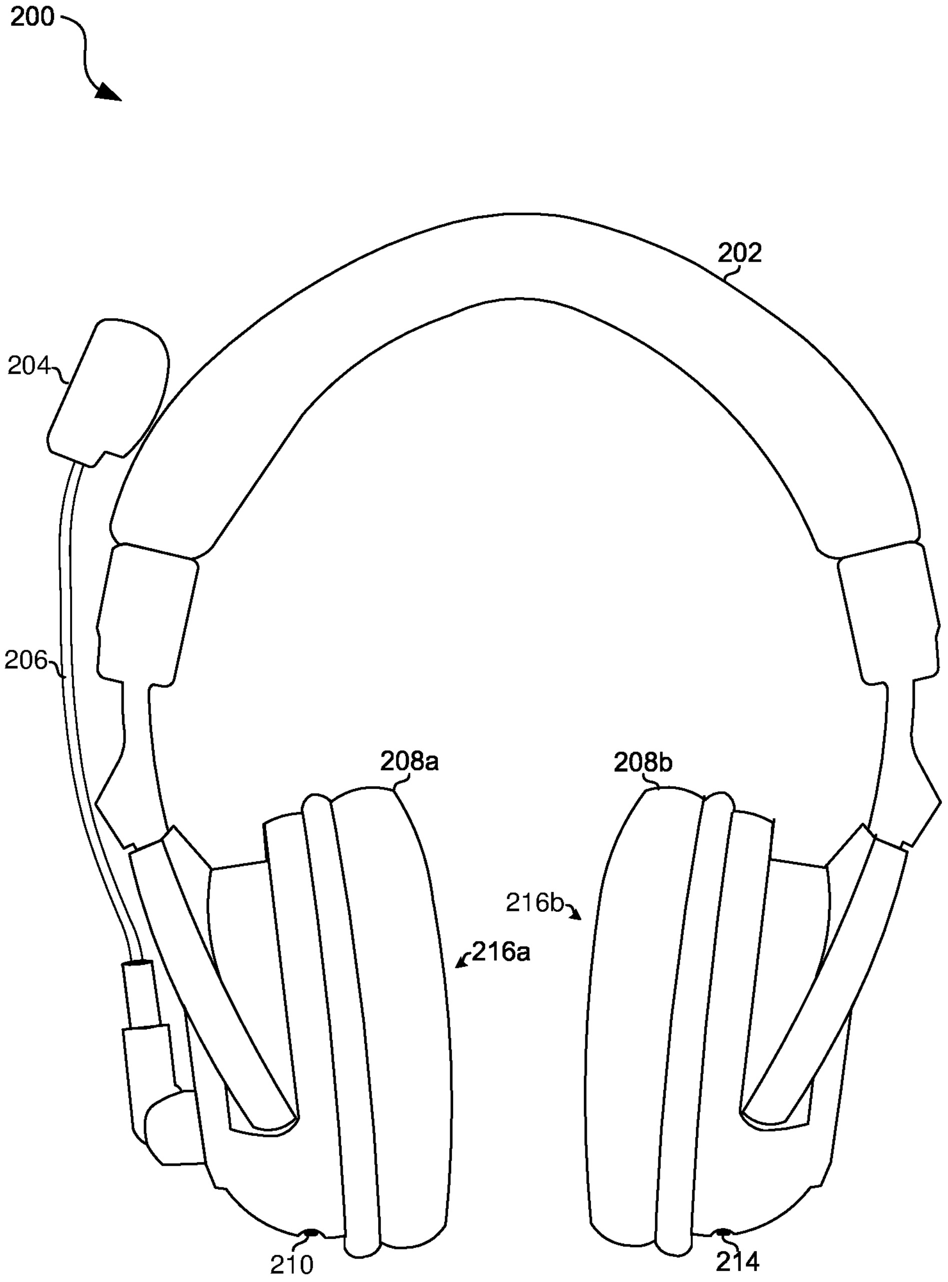
FIGS. 2A and 2B depict two views of an example implementation of a gaming headset.
Figure 2B:
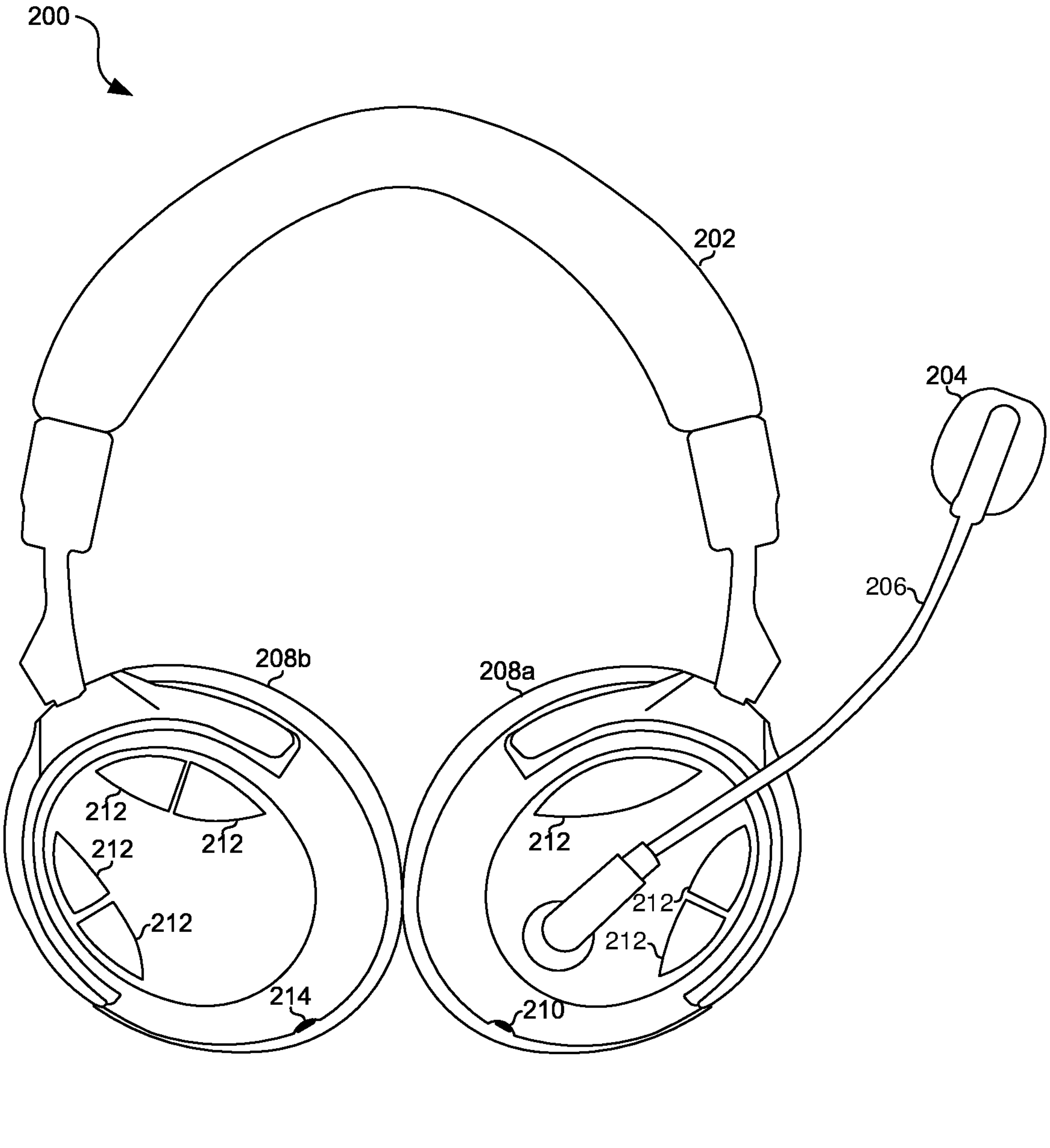

Referring to FIGS. 2A and 2B, there is shown two views of an example headset 200 that receives audio output by a gaming console, such as the console 176, processes the audio, and presents the audio to a listener. The headset 200 comprises a headband 202, a microphone boom 206 with microphone 204, ear cups 208*a* and 208*b* which surround speakers 216*a* and 216*b*, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216*a* and 216*b* convert electrical signals to soundwaves.

The user controls 212 comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
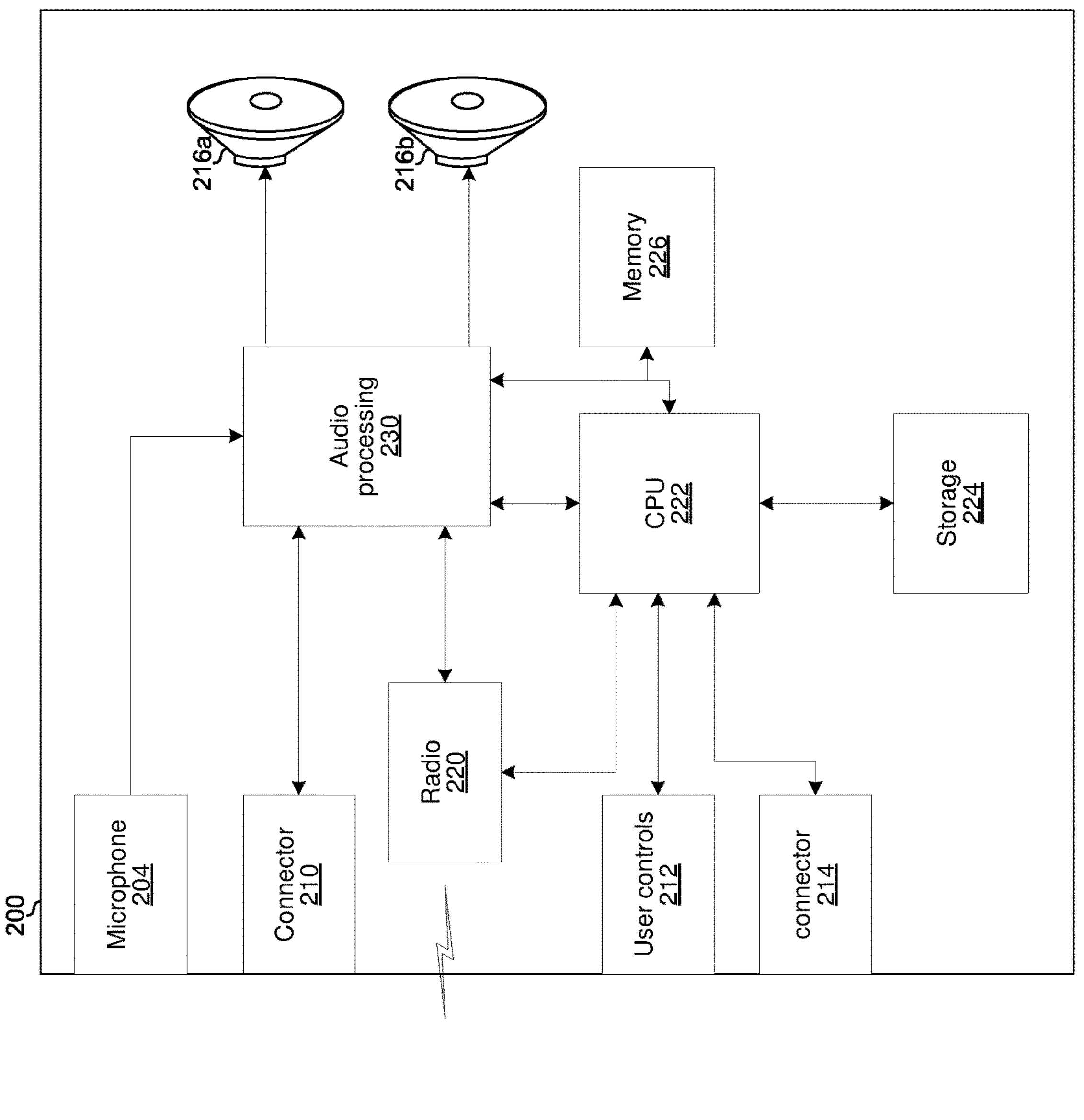
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216*a* and 216*b* already discussed, shown are a radio 220, a CPU 222, a storage device 224, a memory 226, and an audio processing circuit 230.

The radio 220 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 comprises circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 comprises, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the above incorporated co-pending U.S. patent application Ser. No. 13/040,144. Particular parameter settings may be selected autonomously by the headset 200 in accordance with one or more algorithms, based on user input (e.g., via controls 212), and/or based on input received via one or more of the connectors 210 and 214.

The memory 226 comprises volatile memory used by the CPU 230 and/or audio processing circuit 230 as program memory, for storing runtime data, etc.

The audio processing circuit 230 comprises circuitry operable to perform audio processing functions such as volume/gain control, compression, decompression, resampling, analog-to-digital conversion, digital-to-analog conversion, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216*a* and 216*b*. Additionally, or alternatively, the processing may be performed on chat audio that is subsequently output to the connector 210 and/or radio 220.

Figure 3A:
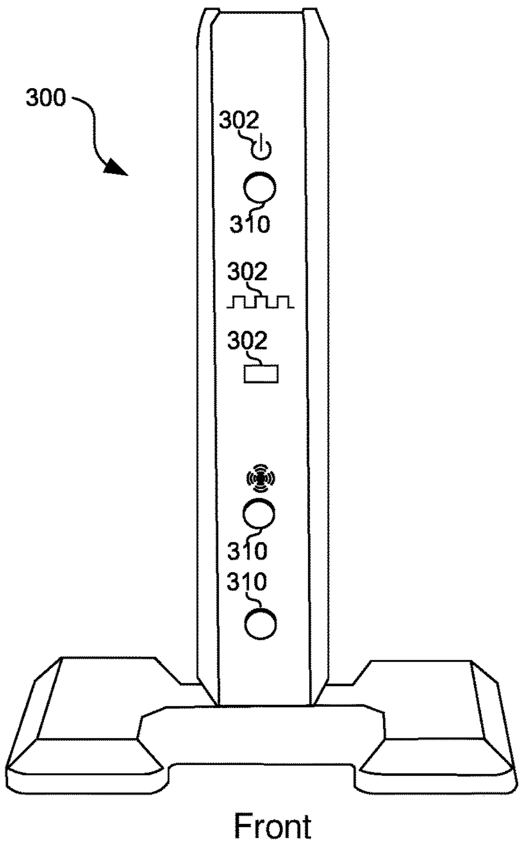
FIG. 3A depicts two views of an example implementation of an audio basestation.

FIG. 3A depicts two views of an example implementation of the audio basestation 300. The basestation 300 comprises status indicators 302, user controls 310, power port 324, and audio connectors 314, 316, 318, and 320.

The audio connectors 314 and 316 comprise digital audio in and digital audio out (e.g., S/PDIF) connectors, respectively. The audio connectors 318 and 320 comprise a left "line in" and a right "line in" connector, respectively. The controls 310 comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 indicate, for example, whether the audio basestation 300 is powered on, whether audio data is being received by the basestation 300 via connectors 314, and/or what type of audio data (e.g., Dolby Digital) is being received by the basestation 300.

Figure 3B:
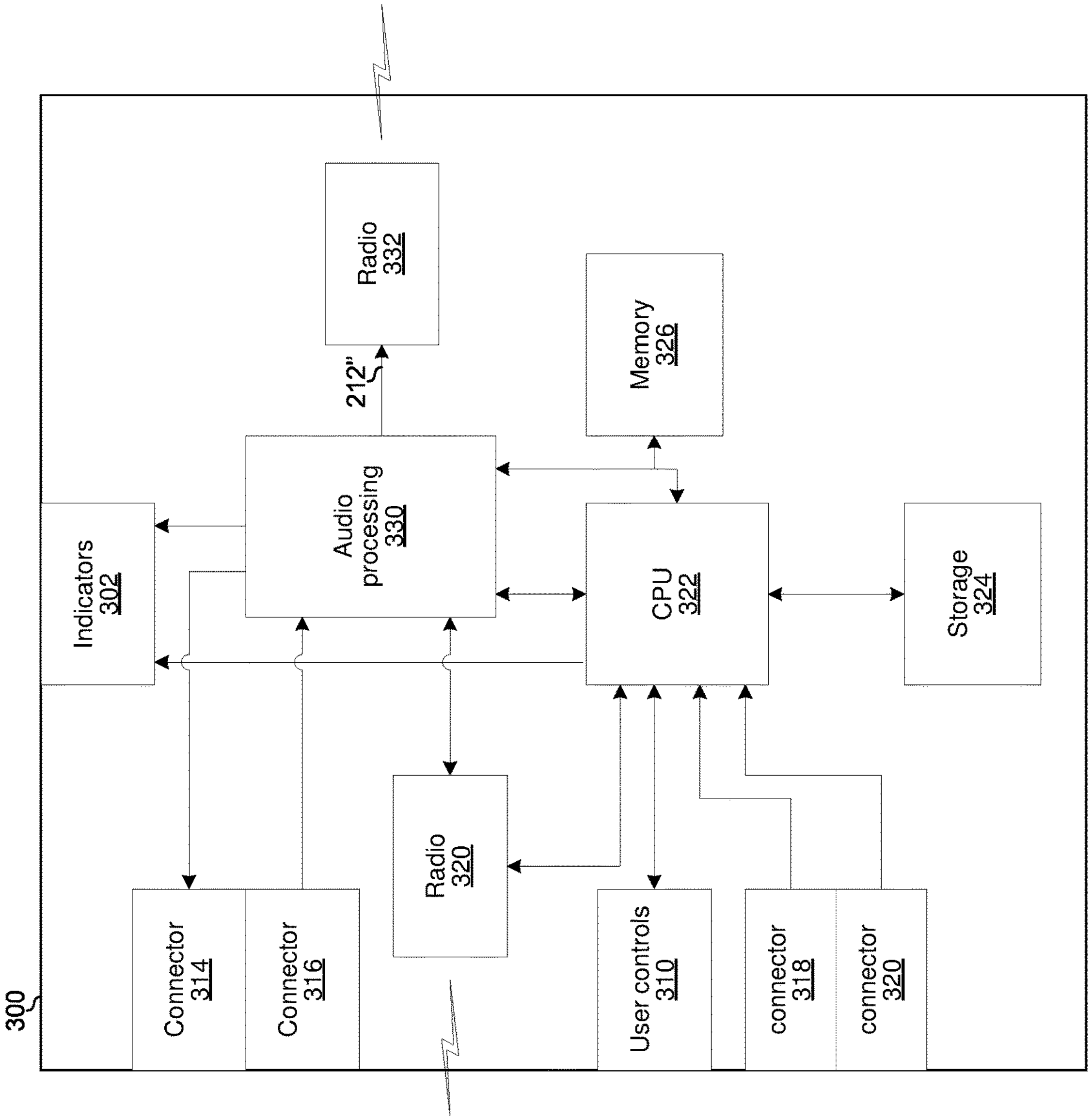
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 comprises, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or more gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in above-incorporated U.S. patent application Ser. No. 13/040,144 titled "Gaming Headset with Programmable Audio" and published as US2012/0014553. Particular parameter settings may be selected autonomously by the basestation 300 in accordance with one or more algorithms, based on user input (e.g., via controls 310), and/or based on input received via one or more of the connectors 314, 316, 318, and 320.

The memory 326 comprises volatile memory used by the CPU 322 and/or audio processing circuit 330 as program memory, for storing runtime data, etc.

The audio processing circuit 330 comprises circuitry operable to perform audio processing functions such as volume/gain control, compression, decompression, resampling, analog-to-digital conversion, digital-to-analog conversion, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

Figure 4:
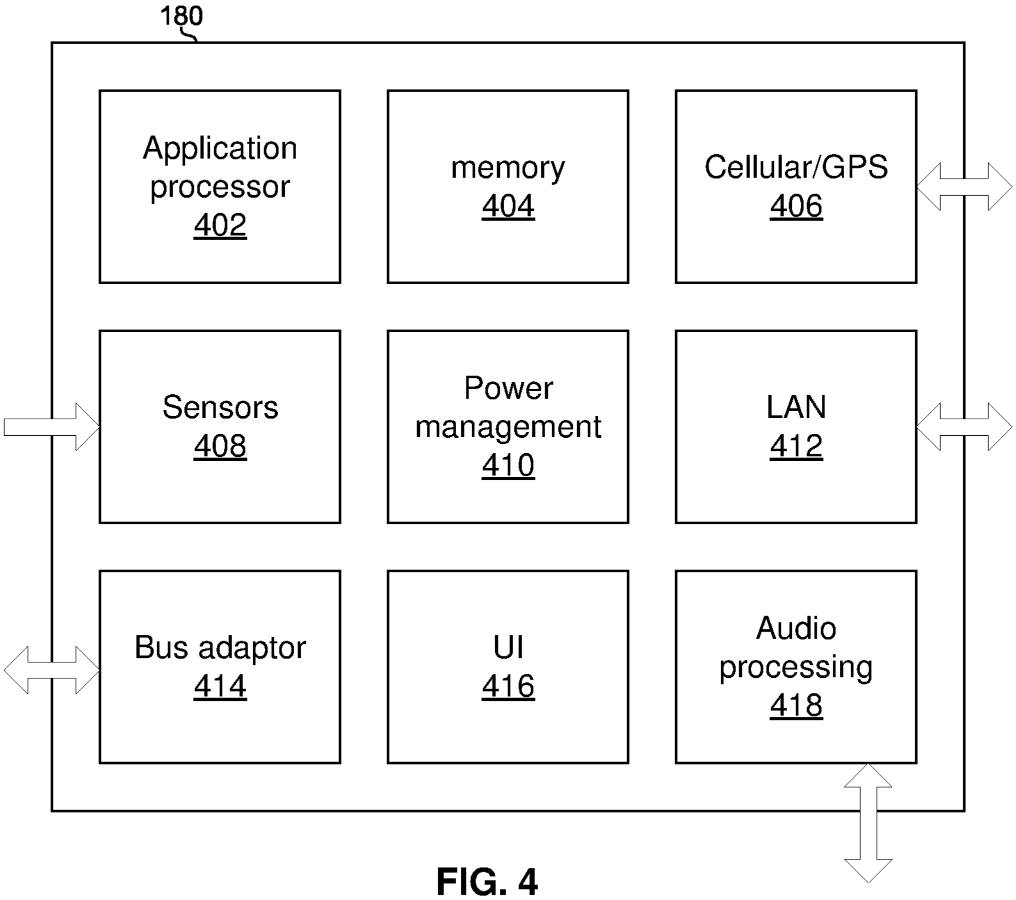
FIG. 4 depicts a block diagram of an example multi-purpose device.

FIG. 4 depicts a block diagram of an example multi-purpose device 180. The example multi-purpose device 180 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 180 as well as graphics processing functions of the multi-purpose device 402. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads and writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 180.

The LAN subsystem 412 comprises circuitry operable to perform baseband processing and analog/RF processing for transmission and reception of cellular and GPS signals.

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 180.

The audio processor 418 comprises circuitry operable to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
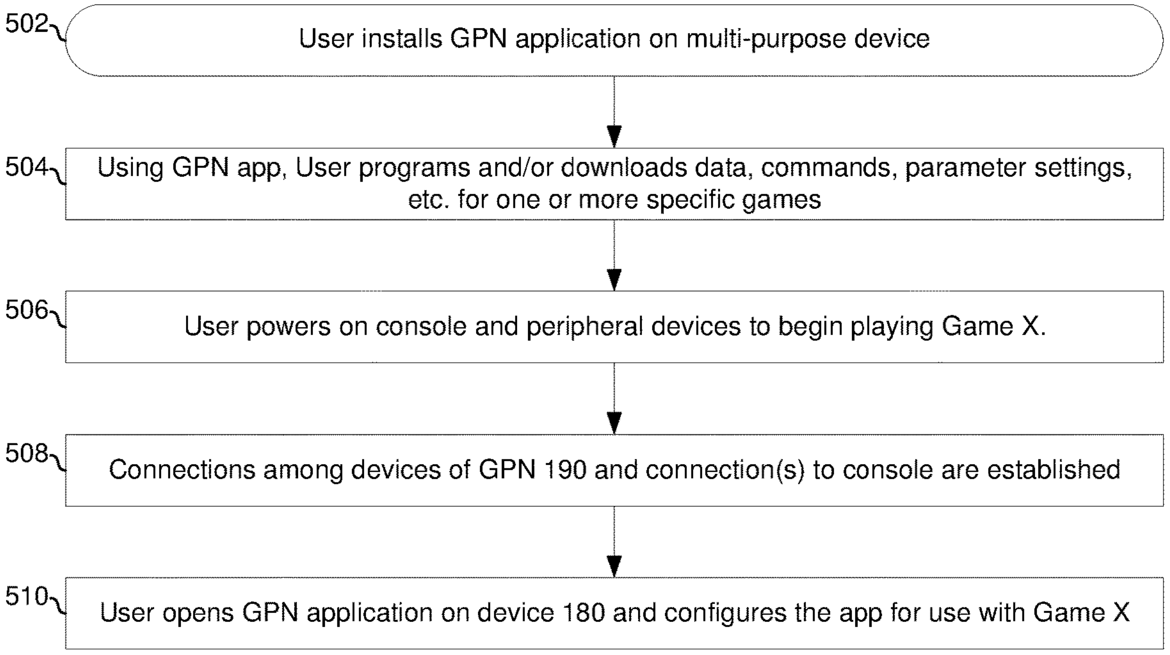
FIG. 5 is a flowchart illustrating an example process for setting up a multi-purpose device for use with a GPN.

FIG. 5 is a flowchart illustrating an exemplary process for setting up a multi-purpose device for use with a GPN. In block 502, a user installs an application onto the multi-purpose device 180 that adapts the multi-purpose device 180 for joining the GPN 190 and interacting with other game peripherals and/or the game console 176. In block 504, the user of the multi-purpose device 180, using the installed GPN app, programs and/or downloads gaming-related data, commands, parameter settings, etc. for one or more specific games that the user intends to play on the console 176. For example, via the installed GPN app, the user may access the database 182 (FIG. 1B) and download one or more records 183 corresponding to the desired games to be played on the console 176. As another example, the user may, using a graphical user interface of the GPN app, create or edit a command, or parameter setting, description, or other information that is to be associated with an audio clip in a database record. The created or edited database record may be stored to local memory (e.g., memory of the subsystem 404) and/or uploaded to the database 182. In block 506, the user powers on game console 176 and the peripheral devices of the GPN 190. In block 508, one or more communication links among the peripheral devices of the GPN and one or more communication links between the GPN 190 and console 176 are established. In block 510, the user opens the GPN application on the device 180 and selects a game (e.g., "Game X") from a list of supported games. For example, the user navigates one or more menus using a touchscreen and/or voice commands to bring up a Game X screen which comprises one or more GUI elements that correspond to commands for Game X, parameter settings for Game X, audio clips for Game X, and/or other data/functions related to Game X.

Figure 6:
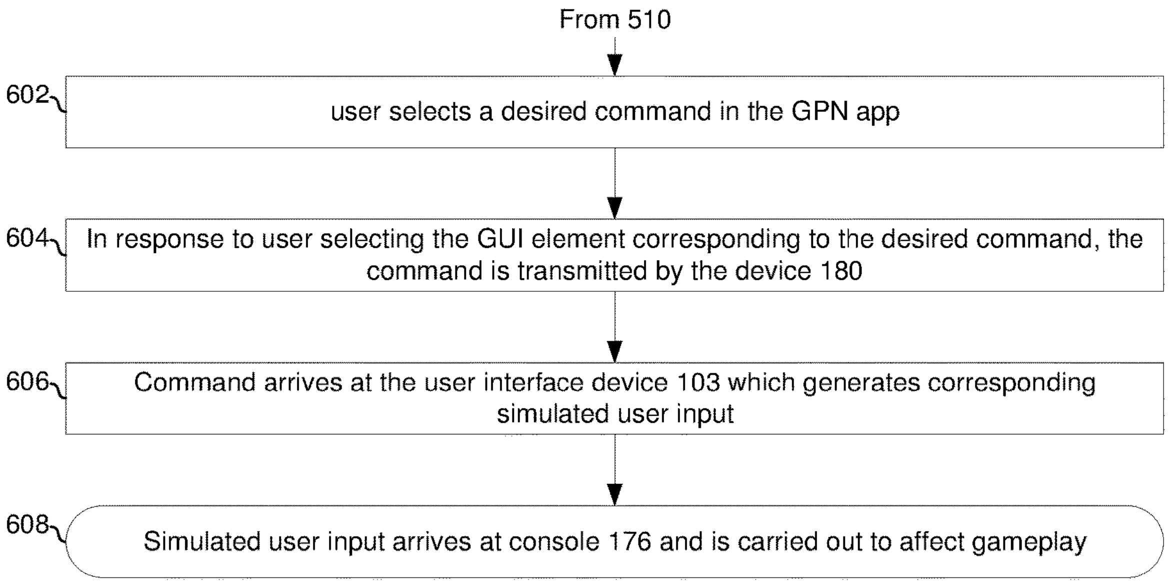
FIG. 6 is a flowchart illustrating an example process for controlling gameplay on the console via a GPN.

FIG. 6 is a flowchart illustrating an example process for controlling gameplay on the console via a GPN. In block 602, which follows block 510 of FIG. 5 in an example implementation, the user playing Game X on game console 176 selects (e.g., using a GUI and/or voice commands) a desired command in the GPN app running on the multi-purpose device. For example, Game X may be a "first person adventure" type game and the command may be "run forward ten steps, duck for five seconds, then jump." In block 604, in response to the user selecting the command, the command is transmitted from the multi-purpose device 180 to the user interface device 102. In block 606, the command is received at the user interface device 102. In response to the command, the user interface device generates simulated user input corresponding to the command and transmits the simulated user input to the game console 176. For example, the user interface device generates the electrical signals that correspond to a user interacting with the controls 103, 105, 107 to run forward ten steps, then duck for five seconds, and then jump. In block 608, the simulated user input arrives at the console 176 and gameplay is affected as if the user had manually performed the user input on the user interface device 103. For example, in response to the received simulated input, the on-screen character runs forward ten steps, ducks for five seconds, and then jumps.

In another example implementation, the commands may be stored in the headset 200 and may be transmitted to the user interface device 102 in response to a voice command or pressing one of the controls 112.

Figure 7:
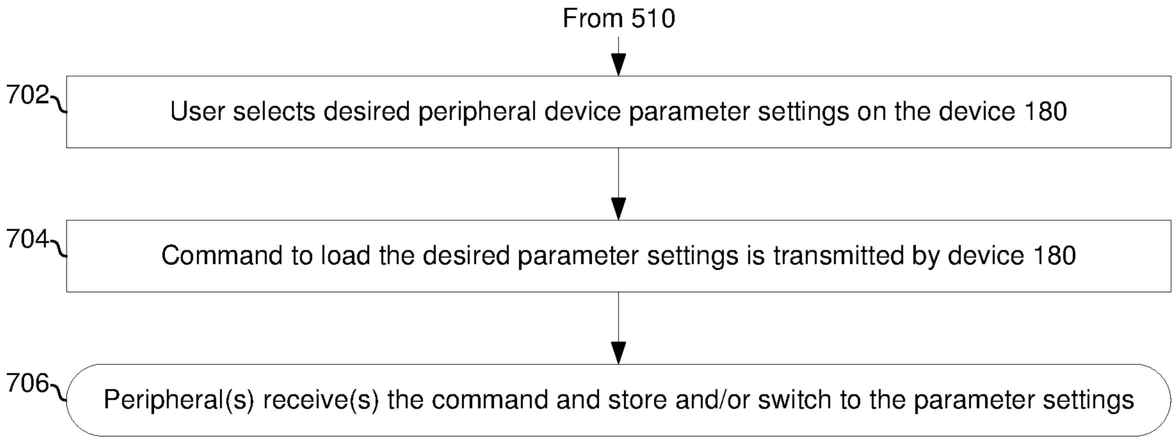
FIG. 7 is a flowchart illustrating an example process for configuring peripherals of a GPN.
Figure 8:
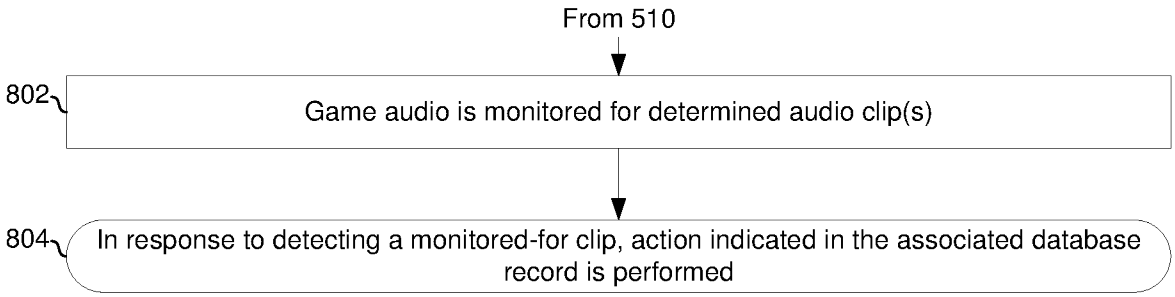
FIG. 8 is a flowchart illustrating an example process for automated, audio-triggered actions in a gaming system.

FIG. 7 is a flowchart illustrating an example process for configuring peripherals of a GPN. In block 702, which follows block 510 of FIG. 5 in an example implementation, the user selects (e.g., using a GUI and/or voice commands) desired parameter settings in the GPN app running on device 180. The parameter settings may be for any one or more peripherals of the GPN 190 and/or for the console 176. As an example, parameter settings for the headset 200 may be as described above. As another example, parameter settings for the user interface device 102 may comprise joystick 107 sensitivity, directional pad 103 sensitivity, button 105 sensitivity, mapping of different functions to different ones of the controls 105, 107, and/or 103 (e.g., changing which button jumps, which joystick controls aiming, etc.), and/or the like. In block 704, in response to selection of parameter settings, the parameter settings and/or a command to load/switch to those parameter settings is transmitted by the device 180 to the associated peripheral device(s). In block 702, the peripheral device(s) associated with the parameter settings receive the command(s) and, in response, store and/or switch to the selected parameter settings FIG. 8 is a flowchart illustrating an example process for automated, audio-triggered actions in a gaming system. In block 802, which follows block 510 of FIG. 5 in an example implementation, game audio output by the game console 176 during gameplay of Game X is monitored for the occurrence of one or more of the specific audio clips associated with Game X in the database 182 and/or in local memory of the device that is monitoring the game audio (e.g., the headset 200, the basestation 300, and/or another device of the GPN 190). In block 804, in response to detecting occurrence of one of the monitored-for audio clips, an action by one or more of the peripheral devices is automatically triggered. For example, the occurrence of a clip may automatically cause selection of a command as in block 602 of FIG. 6 and the blocks 604-608 may then be carried out. As another example, the occurrence of a clip may automatically cause selection of parameter settings as in block 702 of FIG. 7 and the blocks 704-406 may then be carried out. As another example, the occurrence of the clip may cause an audio alert to be generated by the headset 200 and/or a visual alert to be generated on the screen of the device 180.

An electronic device (e.g., device 180 or headset 200) may be configured to present a user interface (e.g., GUI on device 180 or buttons on 212 on headset 200) via which a user can select from a plurality of commands associated with a particular video game. The video game may run on a game console (e.g., console 176) that is separate from the electronic device. In response to a selection of one of the plurality of commands, the electronic device may transmit the selected one of the plurality of commands to a user interface device (e.g., device 102). The selected command may cause the user interface device to transmit a corresponding one or more simulated user inputs to the game console. The selection of the command may occur automatically in response to detection, by audio processing circuitry (e.g., in the electronic device and/or in another device that communicates with the electronic device via a wired or wireless link), of an occurrence of the particular audio clip in an audio signal output by the game console.

Parameter settings for a headset (either the electronic device itself, or a device coupled to the electronic device) may be associated, in memory, with a particular audio clip from the video game. The electronic device may be configured to automatically send the parameter settings to the headset in response to detection, by audio processing circuitry, of an occurrence of the particular audio clip in an audio signal output by the game console. The parameter settings may determine a manner in which the headset processes game audio received by the headset from the game console. The parameter settings may determine a manner in which the headset processes chat audio received by the headset from the game console. The parameter settings may determine a manner in which the headset processes microphone audio to be output by the headset to the game console.

The transmitted selected one of the plurality of commands may be routed to the user interface device via a headset. A link traversed by the transmitted selected one of the plurality of commands from the electronic device to the headset may use a first communication protocol (e.g., Bluetooth), and a link traversed by the transmitted selected one of the plurality of commands from the electronic device to the headset may use a second communication protocol (e.g., Wi-Fi Direct).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method for audio communication, the method comprising:
- in a wireless device comprising one or more speakers and audio processing circuitry:
  - processing a received audio signal for output via the one or more speakers;
  - detecting, in the audio signal, an occurrence of a particular audio clip; and
  - in response to the detection, triggering a transmission of a command associated with the particular audio clip, wherein the wireless device is a headset.

2. The method of claim 1, wherein parameter settings for the wireless device are associated, in memory, with the particular audio clip.

3. The method of claim 2, comprising automatically receiving the parameter settings in the wireless device in response to detecting, by the audio processing circuitry, the occurrence of the particular audio clip in an audio signal output by a game console.

4. The method of claim 2, wherein the parameter settings determine a manner in which the audio processing circuitry processes audio received, via a wireless communication protocol, by the wireless device.

5. The method of claim 2, wherein the parameter settings determine a manner in which the audio processing circuitry processes audio received, via a microphone, by the wireless device.

6. The method of claim 1, comprising communicatively coupling the wireless device to a multi-purpose device.

7. The method of claim 6, wherein the multi-purpose device comprises a smartphone.

8. The method of claim 6, comprising receiving data and/or commands by the wireless device from the multi-purpose device.

9. The method of claim 1, wherein the transmission of the command is via a wireless communication protocol.

10. A wireless device for audio communication, the wireless device comprising:
- one or more speakers; and
- audio processing circuitry operable to:
  - process a received audio signal for output via the one or more speakers,
  - detect, in the audio signal, an occurrence of a particular audio clip, and
  - in response to the detection, trigger a transmission of a command associated with the particular audio clip, wherein the wireless device is a headset.

11. The wireless device of claim 10, wherein parameter settings for the wireless device are associated, in memory, with the particular audio clip.

12. The wireless device of claim 11, wherein the wireless device is operable to receive the parameter settings in response to detecting, by the audio processing circuitry, the occurrence of the particular audio clip in an audio signal output by a game console.

13. The wireless device of claim 11, wherein the parameter settings determine a manner in which the audio processing circuitry processes audio received, via a wireless communication protocol, by the wireless device.

14. The wireless device of claim 11, wherein the parameter settings determine a manner in which the audio processing circuitry processes audio received, via a microphone, by the wireless device.

15. The wireless device of claim 10, wherein the wireless device is operable to be communicatively coupled to a multi-purpose device.

16. The wireless device of claim 15, wherein the multi-purpose device comprises a smartphone.

17. The wireless device of claim 15, wherein the wireless device is operable to receive data and/or commands from the multi-purpose device.

18. The wireless device of claim 10, wherein the transmission of the command is via a wireless communication protocol.

* * * * *